(12) United States Patent
Clausen et al.

(10) Patent No.: US 10,960,927 B2
(45) Date of Patent: Mar. 30, 2021

(54) LONGITUDINAL BEAM AND METHOD FOR THE PRODUCTION THEREOF

(71) Applicant: Benteler Automobiltechnik GmbH, Paderborn (DE)

(72) Inventors: Edvin List Clausen, Lojt Kirkeby Abenra (DK); Andreas Hitz, Erwitte (DE); Tobias Svantesson Kavik, Oslo (NO); Amin Farjad Bastani, Gjovik (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 693 days.

(21) Appl. No.: 15/411,678

(22) Filed: Jan. 20, 2017

(65) Prior Publication Data

US 2017/0210423 A1    Jul. 27, 2017

(30) Foreign Application Priority Data

Jan. 22, 2016 (DE) ...................... 10 2016 101 158.4

(51) Int. Cl.
| | |
|---|---|
| *B62D 21/02* | (2006.01) |
| *B62D 29/00* | (2006.01) |
| *B62D 25/08* | (2006.01) |
| *B21D 22/02* | (2006.01) |
| *B21D 35/00* | (2006.01) |
| *B21C 23/14* | (2006.01) |
| *B21D 53/88* | (2006.01) |

(52) U.S. Cl.
CPC ............ *B62D 21/02* (2013.01); *B21C 23/142* (2013.01); *B21D 22/02* (2013.01); *B21D 35/006* (2013.01); *B21D 53/88* (2013.01); *B62D 25/08* (2013.01); *B62D 29/008* (2013.01)

(58) Field of Classification Search
CPC ...... B62D 25/08; B62D 29/008; B62D 21/02; B62D 21/05; B21C 23/142; B60R 19/34; B60R 19/18; B60R 2019/182
See application file for complete search history.

(56) References Cited

U.S. PATENT DOCUMENTS 4,241,146 A * 12/1980 Sivachenko ............ B21B 1/095
428/124
5,496,067 A    3/1996 Stoll et al.
(Continued)

FOREIGN PATENT DOCUMENTS

| CN | 104384870 A | 3/2015 |
|---|---|---|
| DE | 4204826 A1 | 6/1993 |

(Continued)

OTHER PUBLICATIONS

Office Action for Chinese Application No. 201710045033.1 dated Apr. 2, 2019; 13pp.
(Continued)

*Primary Examiner* — Christine T Cajilig
(74) *Attorney, Agent, or Firm* — Hauptman Ham, LLP

(57) ABSTRACT

A longitudinal beam for a motor vehicle and also to a method for the production of the longitudinal beam is disclosed. The longitudinal beam is produced from a lightweight metal profile. The extrusion direction of the lightweight metal profile runs transverse to the longitudinal direction of the longitudinal beam.

11 Claims, 6 Drawing Sheets

(56) References Cited

U.S. PATENT DOCUMENTS

| | | | | |
|---|---|---|---|---|
| 5,540,016 | A | * | 7/1996 | Clausen ................ B62D 21/15 52/98 |
| 6,279,990 | B1 | * | 8/2001 | Miyasaka ............ B62D 25/025 296/193.06 |
| 7,546,755 | B2 | * | 6/2009 | Arns ...................... C21D 1/673 72/203 |
| 8,287,012 | B2 | * | 10/2012 | Kokubo ................ B21D 53/88 293/102 |
| 8,499,607 | B2 | * | 8/2013 | Kleber ................ B21C 23/142 72/254 |
| 8,616,570 | B2 | * | 12/2013 | Mielke .................. B60G 7/001 280/124.134 |
| 10,507,873 | B2 | * | 12/2019 | Teshima ................ B60R 19/02 |
| 2007/0063546 | A1 | * | 3/2007 | Lassl .................... B62D 25/04 296/193.06 |
| 2008/0106123 | A1 | * | 5/2008 | Lakic ................... B62D 25/04 296/205 |
| 2011/0233961 | A1 | * | 9/2011 | Verbrugge ............ B21C 23/085 296/187.03 |
| 2014/0300126 | A1 | | 10/2014 | Ehrlich et al. |
| 2014/0301775 | A1 | | 10/2014 | Ehrlich et al. |
| 2015/0115654 | A1 | * | 4/2015 | Honda ................ B62D 29/002 296/187.12 |

FOREIGN PATENT DOCUMENTS

| | | |
|---|---|---|
| DE | 69408068 T2 | 8/1998 |
| DE | 19720640 C2 | 3/1999 |
| DE | 19802806 A1 | 7/1999 |
| DE | 102006012528 A1 | 9/2007 |
| DE | 102006041092 A1 | 3/2008 |
| DE | 102013105142 A1 | 11/2014 |
| EP | 2786920 A1 | 10/2014 |
| GB | 2333501 A | 7/1999 |

OTHER PUBLICATIONS

Office Action for Chinese Application No. 201710045033.1 dated Oct. 9, 2019; 11pp.

Office Action for Chinese Application No. 201710045033.1 dated Aug. 2, 2018; 18pp.

* cited by examiner

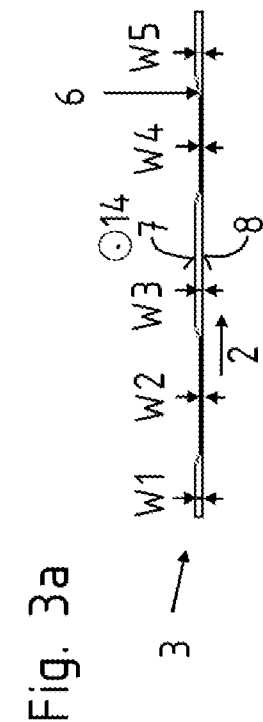

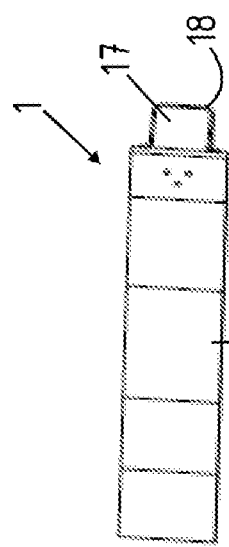
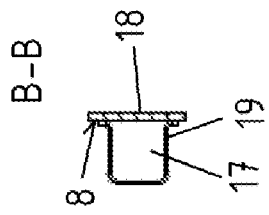
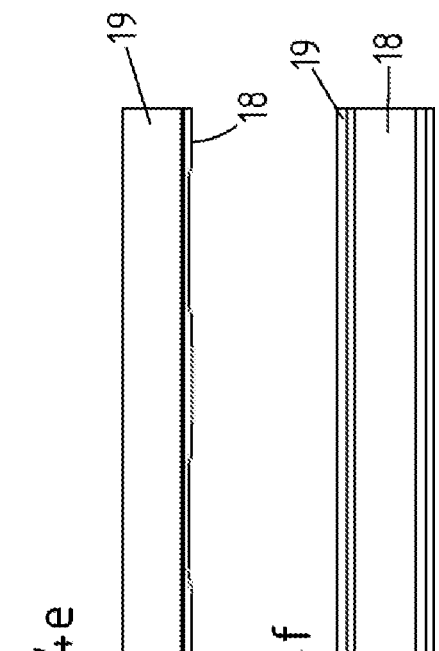
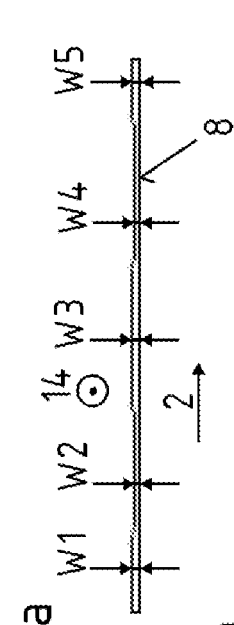
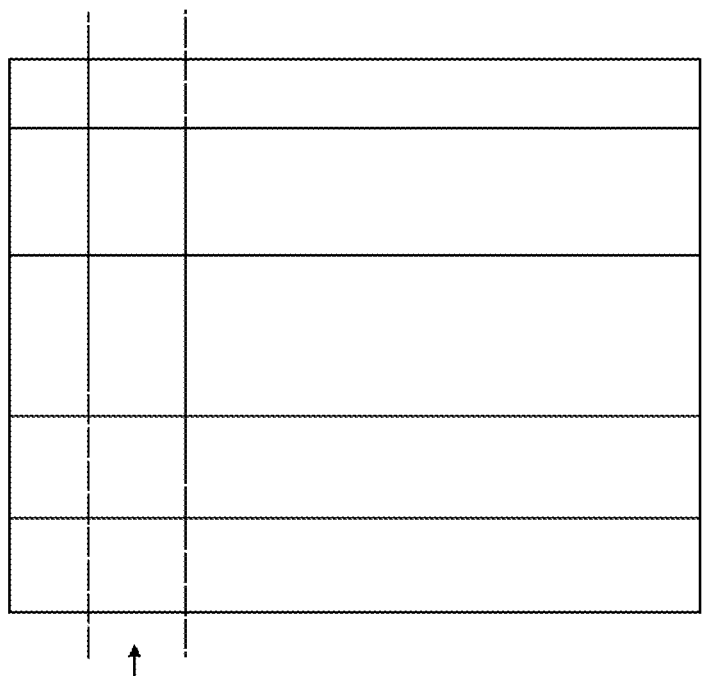

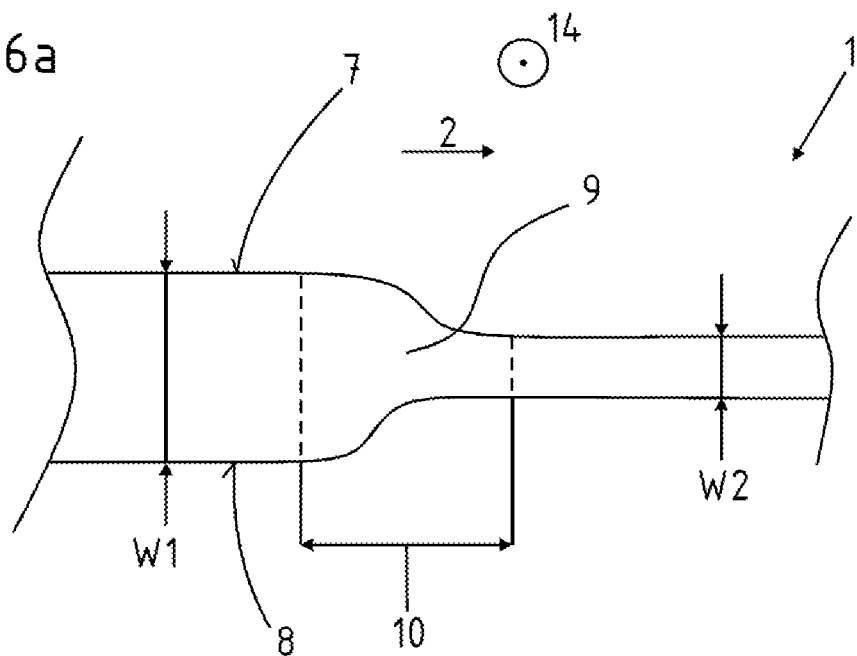
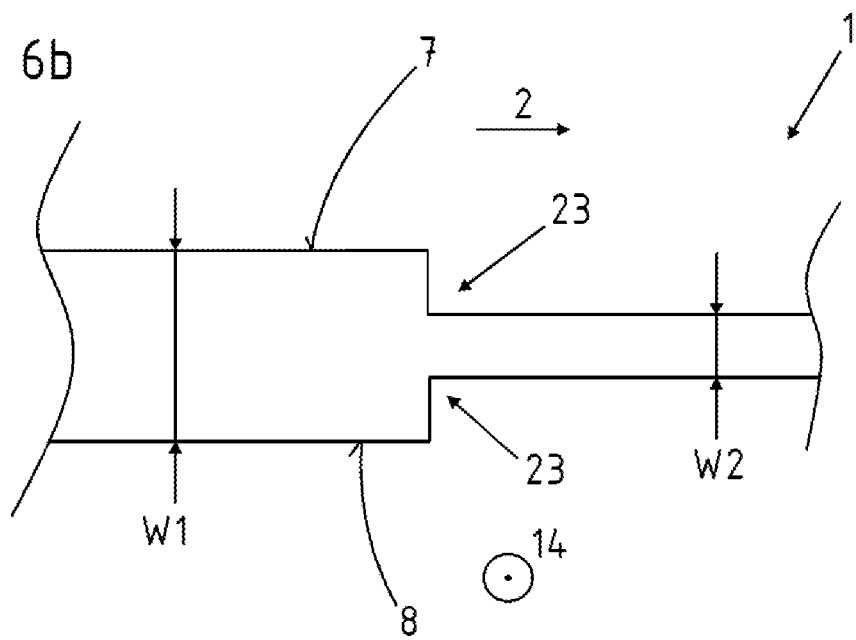

LONGITUDINAL BEAM AND METHOD FOR THE PRODUCTION THEREOF

RELATED APPLICATIONS

The present application claims priority from German Patent Application Number 10 2016 101 158.4, filed Jan. 22, 2016, the disclosure of which is hereby incorporated by reference herein in its entirety.

FIELD OF THE INVENTION

The present invention relates to a longitudinal beam for a motor vehicle as per the features in the preamble of Patent Claim 1.

The present invention furthermore relates to a method for the production of such a longitudinal beam as per the features in the preamble of Patent Claim 11.

BACKGROUND OF THE INVENTION

It is known from the prior art to assemble longitudinal beams in motor vehicles and to produce self-supporting motor vehicle bodies. These self-supporting motor vehicle bodies are mostly produced in this context from metallic materials. In particular, steel materials, but also lightweight metal materials, are used here. An aluminum alloy is used with preference as the lightweight metal material.

At the front or at the rear, a self-supporting motor vehicle body of this type comprises longitudinal beams. The longitudinal beams serve on the one hand for producing a connection to cross-members arranged at a front or rear end, in particular incorporating crash boxes. However, the longitudinal beams also serve, for example, for receiving an axle subframe, but also an engine and/or gear mechanism.

A longitudinal beam is formed as an elongate component profiled in cross section. A longitudinal beam can also be formed as a closed hollow profile component.

SUMMARY OF THE INVENTION

It is an object of the present invention to specify a longitudinal beam and also a method for the production thereof, said longitudinal beam having a particularly low dead weight and being producible cost-effectively and with economical use of material.

The aforementioned object is achieved according to the invention by a longitudinal beam for a motor vehicle as per the features in the patent claim 1.

The part of the object relating to the method is achieved according to the invention by a method in Patent Claim 11.

Advantageous embodiment variants are described in the dependent patent claims.

The longitudinal beam according to the invention for a motor vehicle is formed as an elongate component. It has a profiling in cross section. The profiling can vary in the longitudinal direction. The longitudinal beam is produced by shaping, the starting basis being an extruded lightweight metal profile. The longitudinal beam has differing wall thicknesses in certain length portions. According to the invention, the longitudinal beam is distinguished by the fact that the lightweight metal profile is extruded oriented transversely to the longitudinal direction of the longitudinal beam and was shaped after the extrusion.

Within the context of the invention, the longitudinal direction does not necessarily have to run exactly at a 90° angle to the extrusion direction of the lightweight metal profile. It is also possible for a deviation of several degrees to prevail, in particular depending on the further processing by press forming, but in particular the longitudinal direction of the longitudinal beam runs oriented transversely to the extrusion direction of the lightweight metal profile. It is therefore preferable that the longitudinal direction of the longitudinal beam runs oriented between 70° and 110°, in particular between 80° and 100°, in relation to the actual extrusion direction of the lightweight metal profile.

It is therefore possible firstly to extrude a lightweight metal profile having differing wall thicknesses in an extrusion cross section. Said lightweight metal profile is produced with an extrusion width which is smaller than a later processing width and also smaller than the length of the longitudinal beam. The lightweight metal profile is, however, extruded with an uneven extrusion cross section, for example an extrusion cross section running in wave form.

In a subsequent processing step, said uneven extrusion cross section is widened, in particular flattened. This can be effected, for example, by the application of a compressive force from a top side or a bottom side and/or can be effected by the application of a tensile force at the respective ends of the extrusion cross section. Before or after the flattening or widening, the metal profile is cut to length. This provides semifinished products having a substantially board-like shape. These semifinished products are then processed by shaping, such that the longitudinal beam is provided with its final contour by shaping or by tensile compression shaping, deep drawing or three-dimensional press forming. Consequently, the longitudinal beam is formed as a component of three-dimensionally complex shape with differing wall thicknesses. According to the invention, however, the longitudinal direction of the longitudinal beam is oriented transversely to the original extrusion direction of the lightweight metal profile. This gives rise to the advantage that the wall thickness in certain length portions can be set by the extrusion process specifically to the respective demands in terms of loading, rigidity, crash performance and material use. The extrusion process can preferably be employed in such a manner that a greater wall thickness is produced in those length portions in which provision is made of small cross-sectional widths and/or cross-sectional heights of the later longitudinal beam. A thinner wall thickness can be used in those length portions which have a greater cross-sectional configuration compared to that mentioned above. The cross section of the actual longitudinal beam can then be produced in particular by the shaping. Said cross section can vary in the longitudinal direction. A substantially homogeneous wall thickness is then formed in each case in a cross section, however, with the wall thickness varying in the longitudinal direction of the longitudinal beam.

It is possible to use conventional extrusion apparatuses capable of extruding extrusion widths of 30 cm, 40 cm, 50 cm. As a result of the flattening or widening which follows said extrusion process, however, it is possible to realize component lengths of more than 100 cm up to 150 cm or even 200 cm, such that the component length preferably corresponds to 1.5 times to 4 times the extrusion width. Wall thicknesses of between 1 mm and 10 mm are preferably extruded. In particular, the thinner wall thicknesses of 1 mm to 5 mm, in particular 1.5 mm to 3 mm, are formed. The greater wall thicknesses are preferably formed between 3 mm and 6 mm, in particular between 3.5 mm and 5 mm.

In particular, it is therefore possible to produce a longitudinal beam in one piece and from the same material. However, the longitudinal beam can also be formed as a coupled assembly, and here in particular as a welded assembly. In the latter case, it is possible in particular to produce the longitudinal beam at least in certain length portions as a closed hollow profile. To this end, a closing plate is preferably coupled to the longitudinal beam in certain length portions.

In a preferred embodiment variant of the invention, it is also possible, however, that the two parts of the longitudinal beam are produced in the form of an assembly by the method according to the invention and these two parts are coupled to one another after shaping. This affords the advantage that the two parts each have differing, varying wall thicknesses in certain length portions in a targeted manner for optimized weight. In particular, circumferential grooves can therefore be provided as a support, for example. In particular, these can be formed on the inner side of the hollow profile. It is therefore possible for a targeted compression of the longitudinal beam to be effected in the case of axial force introduction.

A transition portion is preferably formed between two length portions adjacent in the longitudinal direction. Said transition portion is also referred to as a wall thickness transition. The transition portion furthermore preferably has a width extending in the longitudinal direction of the longitudinal beam, the width being formed so as to be smaller than or equal to 3 times, preferably 1.5 times, the greater wall thickness. Said wall thickness in the longitudinal section merges degressively, linearly or progressively from lesser to greater wall thickness or from greater to lesser wall thickness. This affords the advantage in particular that a corresponding wall thickness transition which does not display a notch effect in the subsequent flattening or widening operation can be produced initially in the extrusion process. Constrictions or cracking are avoided as a result.

Alternatively, however, it is also conceivable that the wall thickness transition is formed in a step-like manner. The width of the wall thickness transition is therefore extremely small, preferably smaller than 1 mm. The wall thickness transition from lesser to greater wall thickness is made in accordance with the principle of a step and is made in the form of a jump.

In particular, the greater wall thickness is greater than 1.3 times the lesser wall thickness, preferably greater than 1.5 times the respective adjacent lesser wall thickness.

It is furthermore particularly preferable that the wall thickness transition is formed on the longitudinal beam only on one side. This means that one side with respect to the wall thickness transition is flat or even and the wall thickness transition is formed on the opposing side. As a result of the extrusion process, it is also possible with particular preference, however, that the wall thickness transition is formed on both sides of the longitudinal beam, consequently on a top side and on a bottom side. This also makes it possible in turn to produce the longitudinal beam with optimized weight and at the same time optimized stability by virtue of targeted variations in the wall thickness.

In a further preferred embodiment variant, the longitudinal beam has a greater height in certain length portions, in particular in the installed position, compared to an adjacent length portion. In particular, this can be produced by a trimming operation. At the side of the lightweight metal profile which has been cut to length, said profile can be trimmed at the outer contour in such a manner that extensions directed upward or downward with respect to the installed position are formed, in order, for example, to receive add-on parts or the like.

In addition or as an alternative, the longitudinal beam is formed in particular by coupling with a further part as a closed hollow profile. The longitudinal beam which is actually produced has, however, in particular a C-shaped, U-shaped, W-shaped or hat-shaped cross-sectional profile. The cross-sectional plane of the cross section of the longitudinal beam produced is oriented orthogonally in relation to the cross-sectional plane of the extrusion cross section of the lightweight metal profile.

It is preferable that at least one length portion of thinner wall thickness is formed as a trigger in a length portion of the longitudinal beam, in particular in an end portion in the longitudinal direction. It is preferable that at least two, in particular three, four or more, length portions of thinner wall thickness are formed. These are spaced apart in parallel, such that, upon introduction of an axial force, a targeted compression or deformation of the longitudinal beam is brought about for energy reduction. The transition portions in the case of the trigger are in the form of a jump in particular and have a small width in the longitudinal direction.

It is furthermore particularly preferable that an embodiment variant of the longitudinal beam provides that at least one hollow chamber is formed in certain length portions, consequently a cross section on the longitudinal beam is formed as a closed hollow profile. However, a further length portion is formed as an open hollow profile, for example has a C-shaped, W-shaped or hat-shaped form. This is formed in such a manner that a closing plate or a second part is coupled to the first part of the longitudinal beam in the length portion with the closed hollow profile.

The present invention furthermore relates to a method for the production of a longitudinal beam having at least one of the aforementioned features. The method is distinguished according to the invention by the following method steps:

extruding a lightweight metal profile with an uneven extrusion cross section and an extrusion width, widening the extrusion width by flattening and/or pulling to give a processing width, wherein individual semifinished products are obtained by cutting to length during or after the widening, press-forming the semifinished product to give the longitudinal beam, wherein a trimming operation is carried out before, during or after the press-forming operation.

BRIEF DESCRIPTION OF THE DRAWINGS

Further advantages, features and aspects of the invention are the subject of the following description. Preferred embodiment variants are shown in the schematic figures. These serve for a clear understanding of the invention.

FIGS. 4a to 4f show a production method and also a longitudinal beam produced thereby in various views, FIGS. 6a and 6b show a longitudinal sectional view through the longitudinal beam according to the invention.

DETAILED DESCRIPTION OF THE EMBODIMENTS

In the figures, the same reference signs are used for the same or similar components, even if a repeated description is avoided for reasons of simplification.

Figure 1:
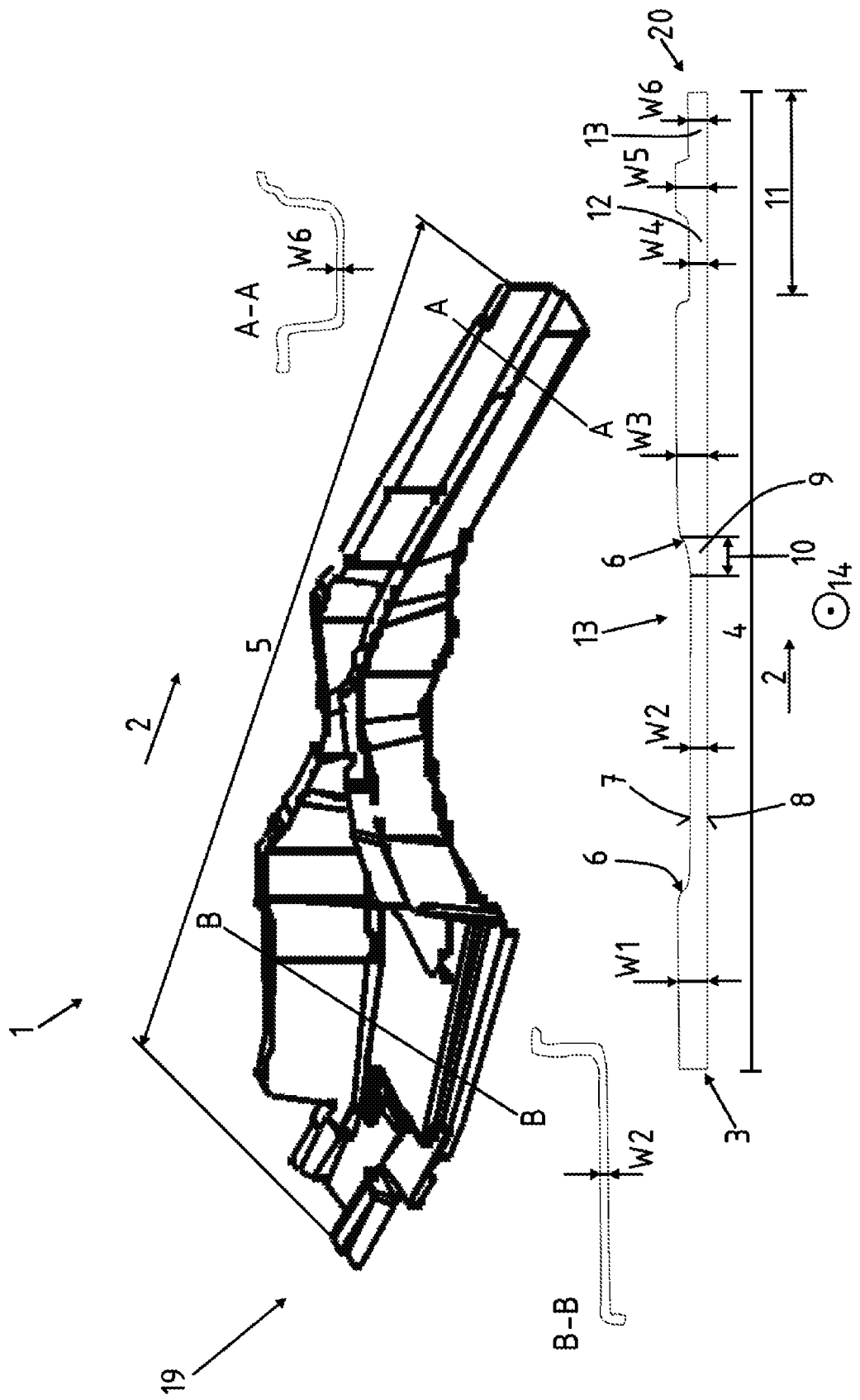
FIG. 1 shows a longitudinal beam produced according to the invention in a perspective view and also sectional views.

FIG. 1 shows a longitudinal beam 1 according to the invention in a perspective view. The longitudinal beam 1 has a contour of three-dimensionally complex shape produced by shaping. It can be seen with reference to the lines of intersection A-A and B-B and also the respectively illustrated cross-sectional view that the longitudinal beam 1 is formed at least in certain length portions as an open hollow profile and in particular as a hat-shaped, C-shaped or L-shaped cross-sectional profile. A respectively homogeneous wall thickness prevails in the cross section.

In its longitudinal direction 2, the longitudinal beam 1 has differing wall thicknesses W1, W2, W3, W4, W5, W6. This is indicated schematically in the longitudinal sectional view of a corresponding semifinished product 3. The latter has a semifinished product length 4 which is greater than or equal to the length 5 of the longitudinal beam 1 itself. Shaping of the semifinished product 3 reduces the length 5 of the longitudinal beam 1 with respect to the semifinished products 4. The wall thickness transitions 6 of the individual wall thicknesses W1, W2, W3, W4, W5, W6 in relation to one another are formed only on a top side 7 (shown here). However, they could also be formed alternatively on a bottom side 8 or on the top side 7 and bottom side 8 (not shown in more detail).

FIG. 1 shows, again by way of example, a transition portion 9 having a width 10 which is preferably smaller than or equal to the greatest adjacent wall thickness W3. The wall thickness merges from lesser wall thickness W2 to greater wall thickness W3 with a degressive progression. However, the wall thickness can also merge in a step-like manner or in the form of a jump (not shown in more detail).

Two length portions 12, 13 of thinner wall thickness W4, W6 are formed in a front end portion 11. Upon the introduction of an axial force, these length portions 12, 13 can bring about a targeted deformation of the longitudinal beam 1. They are also referred to as supports. The greater wall thicknesses W1, W3, W5 can be the same, but can also differ from one another. The comparatively thinner wall thicknesses W2, W4, W6 can likewise each be the same, but can also differ from one another. However, the longitudinal direction 2 is arranged running in a manner oriented transversely to a marked extrusion direction 14 of the lightweight metal profile (not shown in more detail).

Figure 2:
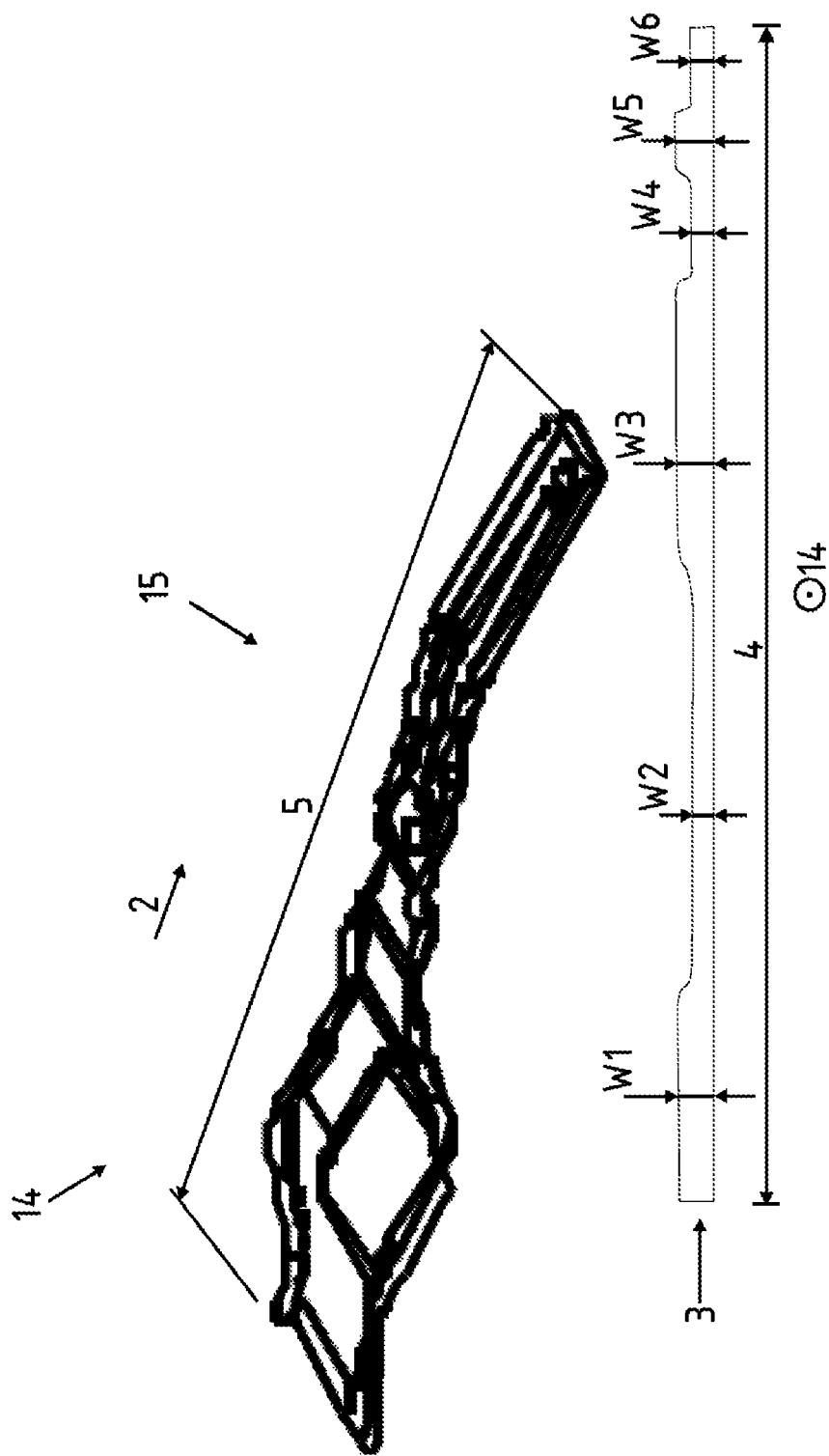
FIG. 2 shows an optional closing plate for the longitudinal beam shown in FIG. 1, FIGS. 3a to 3f show a production method and also a longitudinal beam produced thereby with a closing plate.

FIG. 2 shows an upper shell 15 for a longitudinal beam according to the invention, in particular as shown in FIG. 1. Said longitudinal beam would in this case be formed as the lower shell. The upper shell, too, has differing wall thicknesses W1, W2, W3, W4, W5, W6 in its longitudinal section of the semifinished product 3. These wall thicknesses W1, W2, W3, W4, W5, W6 are formed analogously to the wall thicknesses shown in FIG. 1. The upper shell 15 and the lower shell for the longitudinal beam as shown in FIG. 1 can be produced from the same semifinished product 3. It is preferable, however, that the cut of the outer contour differs. The upper shell 15 and the lower shell are coupled to one another (not shown in more detail), in particular by a thermal joining process.

FIGS. 3c to f show a further embodiment variant of a longitudinal beam 1 according to the invention. It can be seen that said longitudinal beam comprises, in its longitudinal direction 2, length portions which have a greater height H and/or a greater cross-sectional area than adjacent length portions with a comparatively smaller height. By way of example, components (not shown in more detail) such as axles, body components or also engine mounts can be arranged here. It can be seen in particular with reference to the sectional view A-A in FIG. 3d that the longitudinal beam 1 is coupled to a further profile 16 of C-shaped cross section, such that a closed hollow chamber 17 is formed.

FIG. 3a shows a longitudinal sectional view through a widened semifinished product 3 as shown in FIG. 3b. Wall thicknesses W1, W2, W3, W4, W5 which differ from one another in certain length portions in the longitudinal direction 2 of the subsequently produced longitudinal beam 1 can readily be seen. The longitudinal direction is oriented transversely to the extrusion direction 14. Wall thickness transitions 6 are shown between the individual wall thicknesses W1, W2, W3, W4, W5, here too, in turn, only on a top side 7, but not on a bottom side 8. For the coupling as shown in FIG. 3d, it is advantageous for the bottom side 8 to have no wall thickness transitions.

FIGS. 4c to f show a further embodiment of a longitudinal beam 1 in various views. It can be seen that a first part 18 of the longitudinal beam 1 is produced from a semifinished product 3 with wall thicknesses W1, W2, W3, W4, W5 which differ from one another in cross section. A second part 19 in the form of a hollow profile formed with an open cross section is coupled to the first part 18. This is effected, for example, by thermal joining. This gives rise to a closed hollow chamber 17. As shown in FIGS. 4a and b, a profile 16 is in turn firstly extruded and widened, in order to thereby produce differing wall thicknesses W1, W2, W3, W4, W5 for the first part 18.

Figure 5:
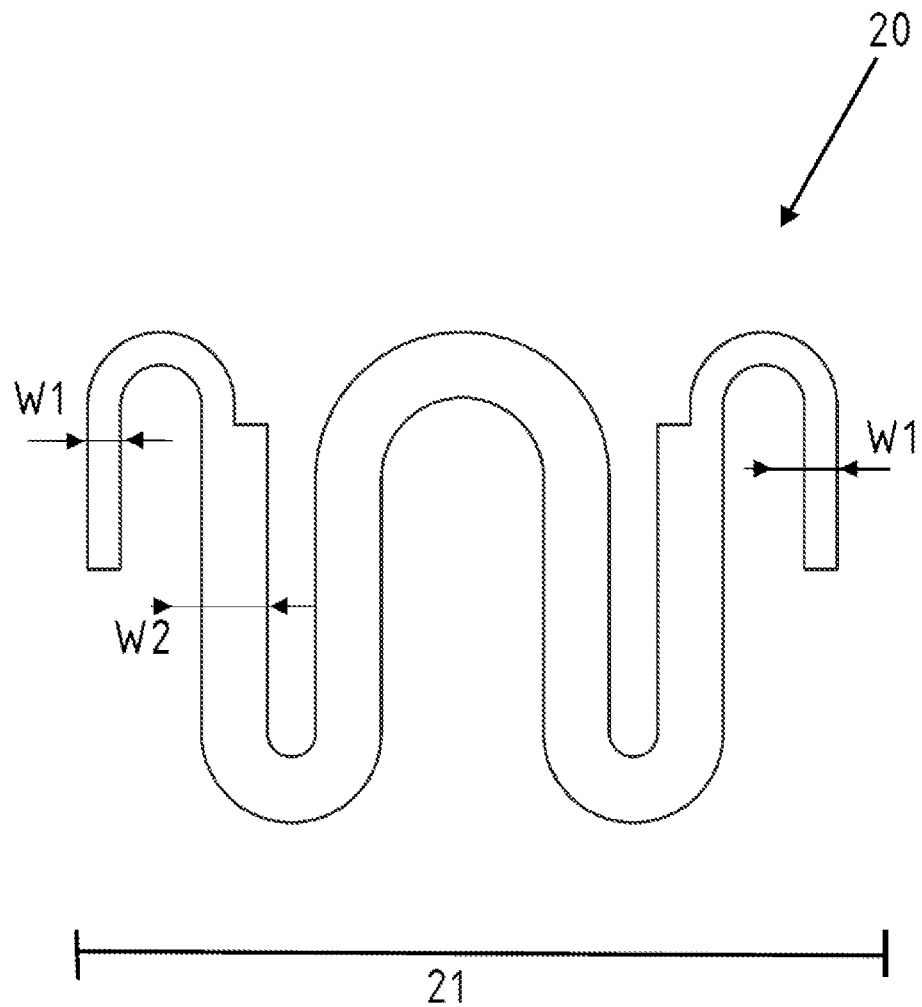
FIG. 5 shows a cross-sectional view of the extruded lightweight metal profile.

FIG. 5 furthermore shows an initially extruded lightweight metal profile 20 having an extrusion width 21 and differing wall thicknesses W1, W2. The extrusion width 21 here is smaller than a processing width 22, shown by way of example in FIG. 3b. The component length then corresponds to the processing width 22, or is slightly smaller than the processing width 22 on account of the three-dimensional press forming.

FIG. 6 shows a longitudinal section through a longitudinal beam 1 according to the invention, with a transition from a greater wall thickness W1 to a lesser wall thickness W2. In the case of FIG. 6a, the wall thickness transition 6 occurs both on the top side 7 and on the bottom side 8 of the longitudinal beam 1 according to the invention. Said longitudinal beam furthermore comprises a transition portion 9 extending by a width 10 in the longitudinal direction 2, the width 10 being smaller than or equal to 3 times the greater wall thickness W1. In the transition portion 9, the cross-sectional profile merges to the wall thickness W2 progressively at the top side 7 and degressively at the bottom side 8.

FIG. 6b likewise shows a transition portion 9 in the form of a wall thickness jump likewise formed on the top side 7 but also on the bottom side 8. The wall thickness jump 23 therefore has an extent in the longitudinal direction 2 preferably of smaller than or equal to 1 mm. In particular, the jump is made in a step-like manner. The illustrations in FIGS. 6a and b can each also be formed only on a top side 7 or only on a bottom side 8. The extrusion direction 14 is likewise shown.

REFERENCE SIGNS

1—Longitudinal beam
2—Longitudinal direction of 1
3—Semifinished product
4—Semifinished product length
5—Length of 1
6—Wall thickness transition
7—Top side
8—Bottom side 9—Transition portion
10—Width of 9
11—End portion
12—Length portion
13—Length portion
14—Extrusion direction
15—Upper shell
16—Profile
17—Hollow chamber
18—First part
19—Second part
20—Lightweight metal profile
21—Extrusion width
22—Processing width
23—Wall thickness jump
H—Height
W1—Wall thickness
W2—Wall thickness
W3—Wall thickness
W4—Wall thickness
W5—Wall thickness
W6—Wall thickness

The invention claimed is:

1. A longitudinal beam for a motor vehicle, the longitudinal beam comprising:
   an elongate shaped component which is profiled in cross section,
   the elongate shaped component being an extruded and shaped lightweight metal profile, which has a plurality of differing wall thicknesses along a longitudinal direction of the longitudinal beam,
   wherein the lightweight metal profile is extruded transversely to the longitudinal direction of the longitudinal beam and shaped after the extrusion into the elongate shaped component, and
   wherein the longitudinal beam comprises, along the longitudinal direction,
      a first length portion having an open hollow profile, which is U-shaped, C-shaped or hat-shaped in cross section taken orthogonally to the longitudinal direction, and
      a second length portion having a closed hollow profile in cross section taken orthogonally to the longitudinal direction,
   wherein the elongate shaped component comprises, along the longitudinal direction of the longitudinal beam,
      a first part having a lesser wall thickness among the plurality of differing wall thicknesses,
      a second part adjacent to the first part and having a greater wall thickness among the plurality of differing wall thicknesses, and
      either a transition portion between the first part and the second part, or a stepwise wall thickness transition formed as a wall thickness jump between the first part and the second part, wherein the first part and the second part are wider than the transition portion.

2. The longitudinal beam according to claim 1, further comprising a further part, wherein
   the first length portion of the longitudinal beam is a corresponding first length portion of the elongate shaped component, and
   the second length portion of the longitudinal beam comprises a corresponding second length portion of the elongate shaped component coupled to the further part as a coupled assembly.

3. The longitudinal beam according to claim 2, wherein in the coupled assembly, at least one of the further part or the corresponding second length portion of the elongate shaped component has differing wall thickness along the longitudinal direction of the longitudinal beam.

4. The longitudinal beam according to claim 2, wherein the further part and the corresponding second length portion of the elongate shaped component are coupled to one another by thermal joining.

5. The longitudinal beam according to claim 1, wherein the elongate shaped component comprises the transition portion, and wherein
   the transition portion has a width in the longitudinal direction smaller than 3 times the greater wall thickness, or
   the transition portion has a wall thickness in a longitudinal section taken along the longitudinal direction, and the wall thickness of the transition portion merges digressively, linearly, or progressively from the lesser wall thickness to the greater wall thickness.

6. The longitudinal beam according to claim 1, wherein the elongate shaped component comprises the stepwise wall thickness transition, and wherein
   the stepwise wall thickness transition is formed on the longitudinal beam only on one side.

7. The longitudinal beam according to claim 1, wherein the longitudinal beam has, along the longitudinal direction, adjacent parts with different heights.

8. The longitudinal beam according to claim 1, wherein an end portion of the elongate shaped component in the longitudinal direction comprises at least one part of a thinner wall thickness among the plurality of differing wall thicknesses, and said at least one part is formed as a trigger in the end portion.

9. A method of producing a longitudinal beam according to claim 1, the method comprising:
   extruding a lightweight metal profile having an uneven extrusion cross section and an extrusion width,
   widening the extrusion width by flattening and/or pulling to give a processing width,
      wherein individual semifinished products are obtained by cutting to length during or after the widening, and
   press-forming one of the semifinished products to obtain the longitudinal beam,
      wherein a trimming operation is carried out before, during or after the press-forming.

10. The longitudinal beam according to claim 1, wherein the elongate shaped component comprises the stepwise wall thickness transition, and wherein
    the stepwise wall thickness transition is formed on both a top side and a bottom side of the elongate shaped component.

11. The longitudinal beam according to claim 1, wherein an end portion of the elongate shaped component in the longitudinal direction comprises at least two parts of a thinner wall thickness among the plurality of differing wall thicknesses, said at least two parts are spaced apart from each other in the longitudinal direction and are formed as a trigger in the end portion.

* * * * *